(12) United States Patent
Millar et al.

(10) Patent No.: US 11,019,773 B2
(45) Date of Patent: Jun. 1, 2021

(54) SYSTEMS AND METHODS FOR MOLECULAR AIR CONTROL IN A GROW POD

(71) Applicant: Grow Solutions Tech LLC, Lehi, UT (US)

(72) Inventors: Gary Bret Millar, Highland, UT (US); Mark Gerald Stott, Eagle Mountain, UT (US); Todd Garrett Tueller, American Fork, UT (US); Michael Stephen Hurst, Farmington, UT (US); Alan Ray Bentley, Alpine, UT (US); Taylor John Woodbury, Provo, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 574 days.

(21) Appl. No.: 15/984,951

(22) Filed: May 21, 2018

(65) Prior Publication Data
US 2018/0359942 A1    Dec. 20, 2018

Related U.S. Application Data

(60) Provisional application No. 62/519,612, filed on Jun. 14, 2017, provisional application No. 62/519,304, filed on Jun. 14, 2017.

(51) Int. Cl.
*A01G 9/18* (2006.01)
*A01G 7/02* (2006.01)
(Continued)

(52) U.S. Cl.
CPC .............. *A01G 9/18* (2013.01); *A01G 7/02* (2013.01); *A01G 9/027* (2013.01); *A01G 9/246* (2013.01); *A01G 31/042* (2013.01); *A01G 9/249* (2019.05)

(58) Field of Classification Search
CPC .......... A01G 9/18; A01G 9/027; A01G 9/246; A01G 7/02
See application file for complete search history.

(56) References Cited

U.S. PATENT DOCUMENTS

| 4,255,897 A * | 3/1981 | Ruthner | ............... A01G 31/042 47/65 |
| 4,356,664 A * | 11/1982 | Ruthner | ............... A01G 31/042 47/65 |

(Continued)

FOREIGN PATENT DOCUMENTS

| CN | 101300958 B | 1/2012 |
| CN | 105475113 A | 4/2016 |

(Continued)

OTHER PUBLICATIONS

Harvest Master CO2 EASI Control URL: https://www.hg-hydroponics.co.uk/harvest-master-co2-easi-control-151-p.asp Date Accessed: Mar. 30, 2018.

(Continued)

*Primary Examiner* — Magdalena Topolski
*Assistant Examiner* — Morgan T Barlow
(74) *Attorney, Agent, or Firm* — Dinsmore & Shohl LLP

(57) ABSTRACT

A molecular air control system includes a shell including an enclosed area, a cart moving on a track within the enclosed area, an air supplier configured to output air into the enclosed area, and a controller. The controller includes one or more processors, one or more memory modules, and machine readable instructions stored in the one or more memory modules that, when executed by the one or more processors, cause the controller to: identify a plant on the cart; determine a target carbon dioxide concentration level for the identified plant based on a molecular recipe for the identified plant; receive a current carbon dioxide concentration level from a carbon dioxide sensor; compare the target (Continued)

carbon dioxide concentration level with the current carbon dioxide concentration level; and adjust carbon dioxide concentration level of the air output from the air supplier based on the comparison.

19 Claims, 9 Drawing Sheets

(51) Int. Cl.
*A01G 31/04* (2006.01)
*A01G 9/02* (2018.01)
*A01G 9/24* (2006.01)

(56) References Cited

U.S. PATENT DOCUMENTS

| | | | | |
|---|---|---|---|---|
| 4,569,150 | A * | 2/1986 | Carlson | A01G 9/26 47/17 |
| 9,241,453 | B1 | 1/2016 | Martin et al. | |
| 2004/0163308 | A1* | 8/2004 | Uchiyama | A01G 31/042 47/1.01 R |
| 2013/0008228 | A1* | 1/2013 | Setlur | G01N 33/497 73/23.2 |
| 2014/0115958 | A1 | 5/2014 | Helene et al. | |
| 2014/0250778 | A1* | 9/2014 | Suntych | A01G 9/20 47/1.4 |
| 2015/0089866 | A1 | 4/2015 | Abbott et al. | |
| 2016/0088807 | A1* | 3/2016 | Bermudez Rodriguez | A01G 25/16 700/284 |
| 2016/0100531 | A1* | 4/2016 | Ascherman | A01G 7/02 700/283 |
| 2017/0156275 | A1* | 6/2017 | Yano | A01G 22/00 |
| 2017/0318756 | A1* | 11/2017 | Erickson | A01G 7/02 |
| 2018/0054985 | A1* | 3/2018 | Li | A01G 7/045 |
| 2018/0235247 | A1* | 8/2018 | Kamei | F25D 17/042 |
| 2018/0325036 | A1* | 11/2018 | Treville | A01M 13/00 |
| 2018/0332776 | A1* | 11/2018 | O'Keefe | C12M 43/06 |
| 2018/0343806 | A1* | 12/2018 | Leo | C05G 1/00 |
| 2020/0100445 | A1* | 4/2020 | Saba | G06F 7/00 |

FOREIGN PATENT DOCUMENTS

| | | | | |
|---|---|---|---|---|
| EP | 2638797 | A1 | 9/2013 | |
| JP | 06261911 | B2 | 1/2018 | |
| WO | WO-2010104022 | A1 * | 9/2010 | C05F 17/50 |
| WO | 2013059865 | A1 | 5/2013 | |
| WO | 2016164652 | A1 | 10/2016 | |
| WO | 2017041164 | A1 | 3/2017 | |

OTHER PUBLICATIONS

International Search Report for PCT/US2018/034065 dated Nov. 19, 2018.

* cited by examiner

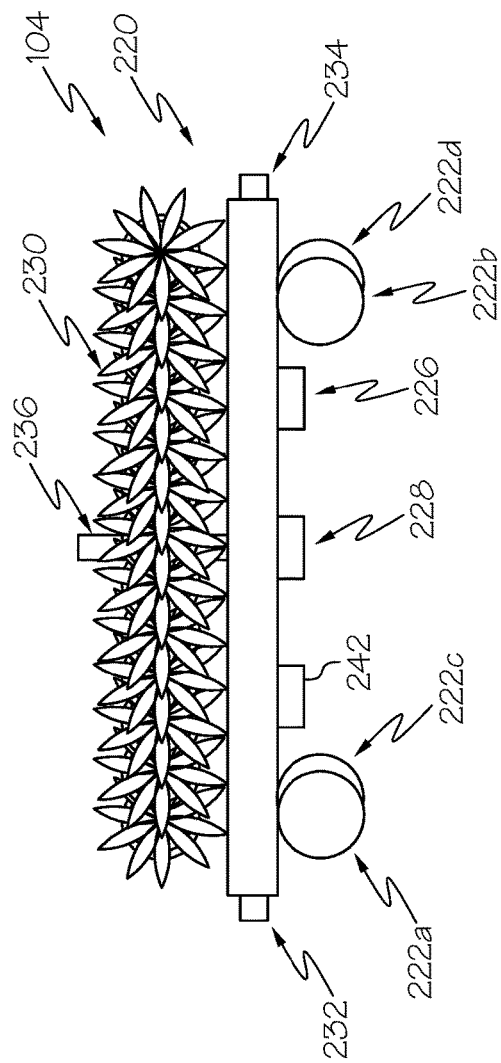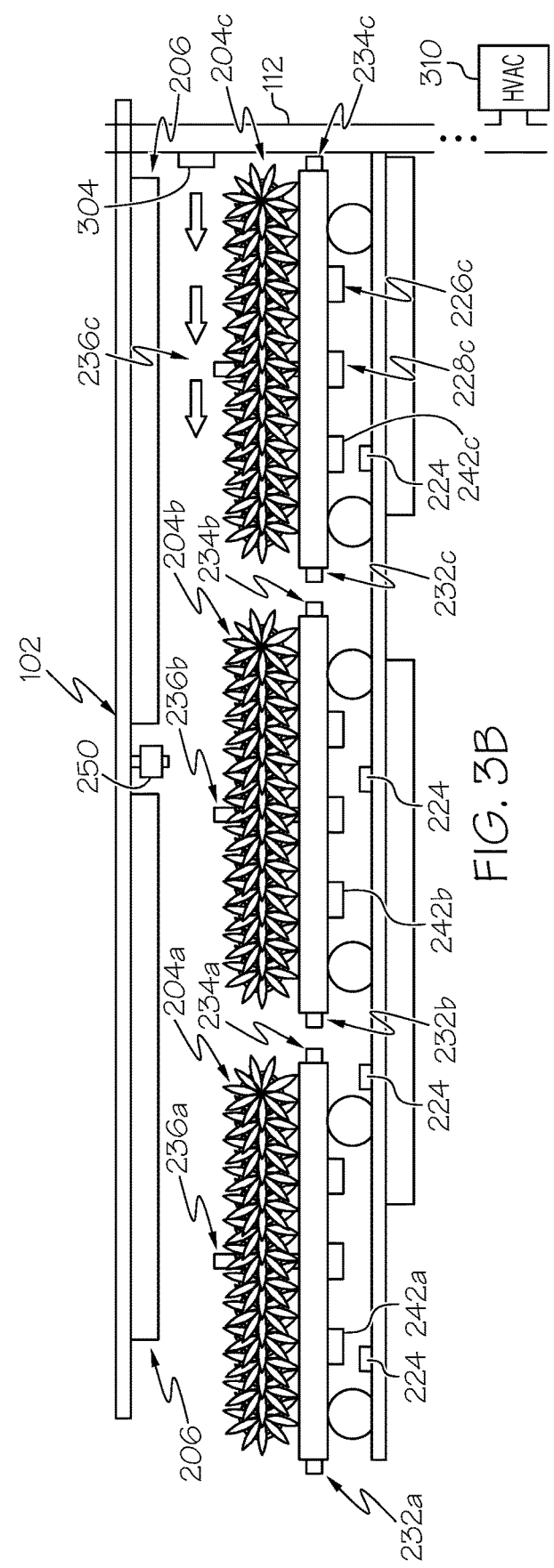

SYSTEMS AND METHODS FOR MOLECULAR AIR CONTROL IN A GROW POD

CROSS REFERENCE TO RELATED APPLICATIONS

This application claims the benefit of U.S. Provisional Patent Application Nos. 62/519,612 and 62/519,304 all filed on Jun. 14, 2017, the entire contents of which are herein incorporated by reference.

TECHNICAL FIELD

Embodiments described herein generally relate to systems and methods for providing molecular air control in a grow pod and, more specifically, to controlling the level of carbon dioxide in the assembly line grow pod based on molecular recipes.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

For indoor crop growing systems, adequate molecular control for crops is important to enhance production and quality of crops. Thus, a system for controlling an air molecular concentration level, particularly, a carbon dioxide concentration level in an indoor crop grow pod may be needed.

SUMMARY

In one embodiment, a molecular air control system is provided. The system includes a shell including an enclosed area, a cart moving on a track within the enclosed area, an air supplier configured to output air into the enclosed area, and a controller. The controller includes one or more processors, one or more memory modules, and machine readable instructions stored in the one or more memory modules that, when executed by the one or more processors, cause the controller to: identify a plant on the cart; determine a target carbon dioxide concentration level for the identified plant based on a molecular recipe for the identified plant; receive a current carbon dioxide concentration level from a carbon dioxide sensor; compare the target carbon dioxide concentration level with the current carbon dioxide concentration level; and adjust carbon dioxide concentration level of the air output from the air supplier based on the comparison.

In another embodiment, a controller for controlling molecular air in an assembly line grow pod is provided. The controller includes one or more processors, one or more memory modules, and machine readable instructions stored in the one or more memory modules that, when executed by the one or more processors, cause the controller to: identify a plant in a cart moving on a track in the assembly line grow pod; determine a target carbon dioxide concentration level for the identified plant based on a molecular recipe for the identified plant; receive a current carbon dioxide concentration level from a carbon dioxide sensor; compare the target carbon dioxide concentration level with the current carbon dioxide concentration level; and adjust carbon dioxide concentration level of air output from an air supplier of the assembly line grow pod based on the comparison.

In another embodiment, a method for controlling molecular air for a plant in an assembly line grow pod is provided. The method includes identifying, by a controller of the assembly line grow pod, a plant in a cart moving on a track in the assembly line grow pod, determining, by the controller of the assembly line grow pod, a target carbon dioxide concentration level for the identified plant based on a molecular recipe for the identified plant, receiving, by the controller of the assembly line grow pod, a current carbon dioxide concentration level from a carbon dioxide sensor, comparing, by the controller of the assembly line grow pod, the target carbon dioxide concentration level with the current carbon dioxide concentration level, and adjusting, by the controller of the assembly line grow pod, carbon dioxide concentration level of air being output from an air supplier of the assembly line grow pod based on the comparison.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 3A depicts an industrial cart for coupling to a track, according to embodiments described herein;

FIG. 3B depicts a partial view of the assembly line grow pod, according to embodiments described herein;

DETAILED DESCRIPTION

Embodiments disclosed herein include systems for molecular air control for an assembly line grow pod. The system includes a shell including an enclosed area, a cart moving on a track within the enclosed area, an air supplier configured to output air into the enclosed area, and a controller. The controller includes one or more processors, one or more memory modules, and machine readable instructions stored in the one or more memory modules that, when executed by the one or more processors, cause the controller to: identify a plant on the cart; determine a target carbon dioxide concentration level for the identified plant based on a molecular recipe for the identified plant; receive a current carbon dioxide concentration level from a carbon dioxide sensor; compare the target carbon dioxide concentration level with the current carbon dioxide concentration level; and adjust carbon dioxide concentration level of the air output from the air supplier based on the comparison. The systems for providing molecular air control in a grow pod incorporating the same will be described in more detail, below.

Figure 1:
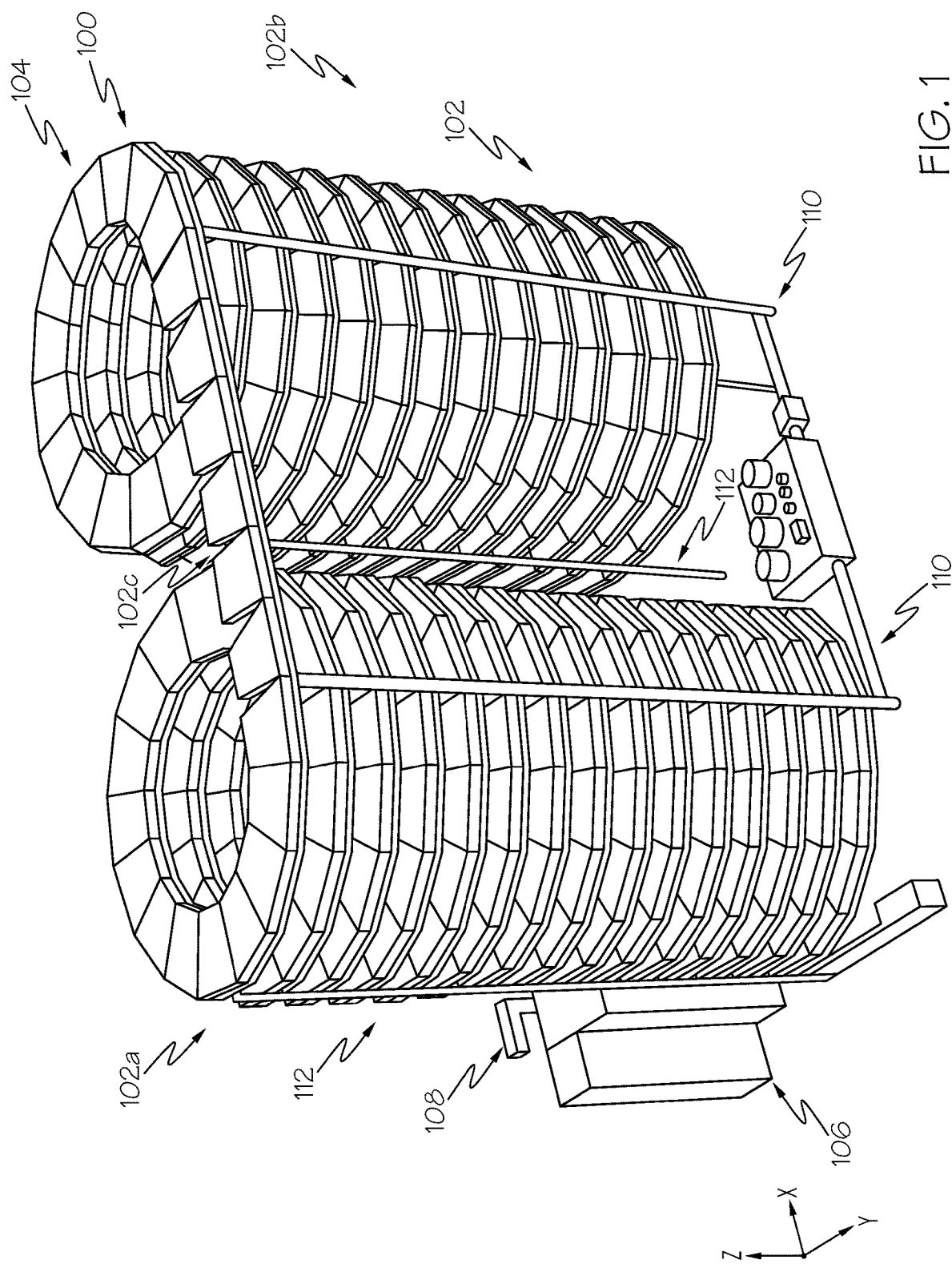
FIG. 1 depicts an assembly line grow pod, according to embodiments described herein.

Referring now to the drawings, FIG. 1 depicts an assembly line grow pod 100 that receives a plurality of industrial carts 104, according to embodiments described herein. The assembly line grow pod 100 may be positioned on an x-y plane as shown in FIG. 1. As illustrated, the assembly line grow pod 100 may include a track 102 that holds one or more industrial carts 104. Each of the one or more industrial carts 104, as described in more detail with reference to FIGS. 3A and 3B, may include one or more wheels 222a, 222b, 222c, and 222d rotatably coupled to the industrial cart 104 and supported on the track 102, as described in more detail with reference to FIGS. 3A and 3B.

Additionally, a drive motor is coupled to the industrial cart 104. In some embodiments, the drive motor may be coupled to at least one of the one or more wheels 222a, 222b, 222c, and 222d such that the industrial cart 104 may be propelled along the track 102 in response to a signal transmitted to the drive motor. In other embodiments, the drive motor may be rotatably coupled to the track 102. For example, without limitation, the drive motor may be rotatably coupled to the track 102 through one or more gears which engage a plurality of teeth arranged along the track 102 such that the industrial cart 104 may be propelled along the track 102.

The track 102 may consist of a plurality of modular track sections. The plurality of modular track sections may include a plurality of straight modular track sections and a plurality of curved modular track sections. The track 102 may include an ascending portion 102a, a descending portion 102b, and a connection portion 102c. The ascending portion 102a and the descending portion 102b may include the plurality of curved modular track sections. The ascending portion 102a may wrap around (e.g., in a counterclockwise direction as depicted in FIG. 1) a first axis such that the industrial carts 104 ascend upward in a vertical direction. The first axis may be parallel to the z axis as shown in FIG. 1 (i.e., perpendicular to the x-y plane).

The descending portion 102b may be wrapped around a second axis (e.g., in a counterclockwise direction as depicted in FIG. 1) that is substantially parallel to the first axis, such that the industrial carts 104 may be returned closer to ground level. The plurality of curved modular track sections of the descending portion 102b may be tilted relative to the x-y plane (i.e., the ground) by a predetermined angle.

The connection portion 102c may include a plurality of straight modular track sections. The connection portion 102c may be relatively level with respect to the x-y plane (although this is not a requirement) and is utilized to transfer the industrial carts 104 from the ascending portion 102a to the descending portion 102b. In some embodiments, a second connection portion (not shown in FIG. 1) may be positioned near ground level that couples the descending portion 102b to the ascending portion 102a such that the industrial carts 104 may be transferred from the descending portion 102b to the ascending portion 102a. The second connection portion may include a plurality of straight modular track sections.

In some embodiments, the track 102 may include two or more parallel rails that support the industrial cart 104 via the one or more wheels 222a, 222b, 222c, and 222d rotatably coupled thereto. In some embodiments, at least two of the parallel rails of the track 102 are electrically conductive, thus capable of transmitting communication signals and/or power to and from the industrial cart 104. In yet other embodiments, a portion of the track 102 is electrically conductive and a portion of the one or more wheels 222a, 222b, 222c, and 222d are in electrical contact with the portion of the track 102 which is electrically conductive. In some embodiments, the track 102 may be segmented into more than one electrical circuit. That is, the electrically conductive portion of the track 102 may be segmented with a non-conductive section such that a first electrically conductive portion of the track 102 is electrically isolated from a second electrically conductive portion of the track 102 which is adjacent to the first electrically conductive portion of the track 102.

The communication signals and power may further be received and/or transmitted via the one or more wheels 222a, 222b, 222c, and 222d of the industrial cart 104 and to and from various components of industrial cart 104, as described in more detail herein. Various components of the industrial cart 104, as described in more detail herein, may include the drive motor, the control device, and one or more sensors.

In some embodiments, the communication signals and power signals may include an encoded address specific to an industrial cart 104 and each industrial cart 104 may include a unique address such that multiple communication signals and power may be transmitted over the same track 102 and received and/or executed by their intended recipient. For example, the assembly line grow pod 100 system may implement a digital command control system (DCC). DDC systems encode a digital packet having a command and an address of an intended recipient, for example, in the form of a pulse width modulated signal that is transmitted along with power to the track 102.

In such a system, each industrial cart 104 includes a decoder, which may be the control device coupled to the industrial cart 104, designated with a unique address. When the decoder receives a digital packet corresponding to its unique address, the decoder executes the embedded command. In some embodiments, the industrial cart 104 may also include an encoder, which may be the control device coupled to the industrial cart 104, for generating and transmitting communications signals from the industrial cart 104, thereby enabling the industrial cart 104 to communicate with other industrial carts 104 positioned along the track 102 and/or other systems or computing devices communicatively coupled with the track 102.

While the implementation of a DCC system is disclosed herein as an example of providing communication signals along with power to a designated recipient along a common interface (e.g., the track 102) any system and method capable of transmitting communication signals along with power to and from a specified recipient may be implemented. For example, in some embodiments, digital data may be transmitted over AC circuits by utilizing a zero-cross, step, and/or other communication protocol.

Additionally, while not explicitly illustrated in FIG. 1, the assembly line grow pod 100 may also include a harvesting component, a tray washing component, and other systems and components coupled to and/or in-line with the track 102. In some embodiments, the assembly line grow pod 100 may include a plurality of lighting devices, such as light emitting diodes (LEDs). The lighting devices may be disposed on the track 102 opposite the industrial carts 104, such that the lighting devices direct light waves to the industrial carts 104 on the portion the track 102 directly below. In some embodiments, the lighting devices are configured to create a plurality of different colors and/or wavelengths of light, depending on the application, the type of plant being grown, and/or other factors. Each of the plurality of lighting devices may include a unique address such that a master controller 106 may communicate with each of the plurality of lighting devices. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device 130, a nutrient dosing component, a water distribution component, and/or other hardware for controlling various components of the assembly line grow pod 100. In some embodiments, the master controller 106 and/or the computing device 130 are communicatively coupled to a network 550 (as depicted and further described with reference to FIG. 3C). The master controller 106 may control operations of the HVAC system 310 shown in FIG. 3C, which will be described in detail below.

Coupled to the master controller 106 is a seeder component 108. The seeder component 108 may be configured to seed one or more industrial carts 104 as the industrial carts 104 pass the seeder in the assembly line. Depending on the particular embodiment, each industrial cart 104 may include a single section tray for receiving a plurality of seeds. Some embodiments may include a multiple section tray for receiving individual seeds in each section (or cell). In the embodiments with a single section tray, the seeder component 108 may detect presence of the respective industrial cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the industrial carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc. In some embodiments, the seeder component 108 may communicate the identification of the seeds being distributed to the master controller 106.

The watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, humidity control, pressure control, carbon dioxide control, oxygen control, nitrogen control, etc. Accordingly, the airflow lines 112 may distribute the airflow at predetermined areas in the assembly line grow pod 100. For example, the airflow lines 112 may extend to each story of the ascending portion 102*a* and the descending portion 102*b*.

It should be understood that while some embodiments of the track may be configured for use with a grow pod, such as that depicted in FIG. 1, this is merely an example. The track and track communications are not so limited and can be utilized for any track system where communication is desired.

Figure 2:
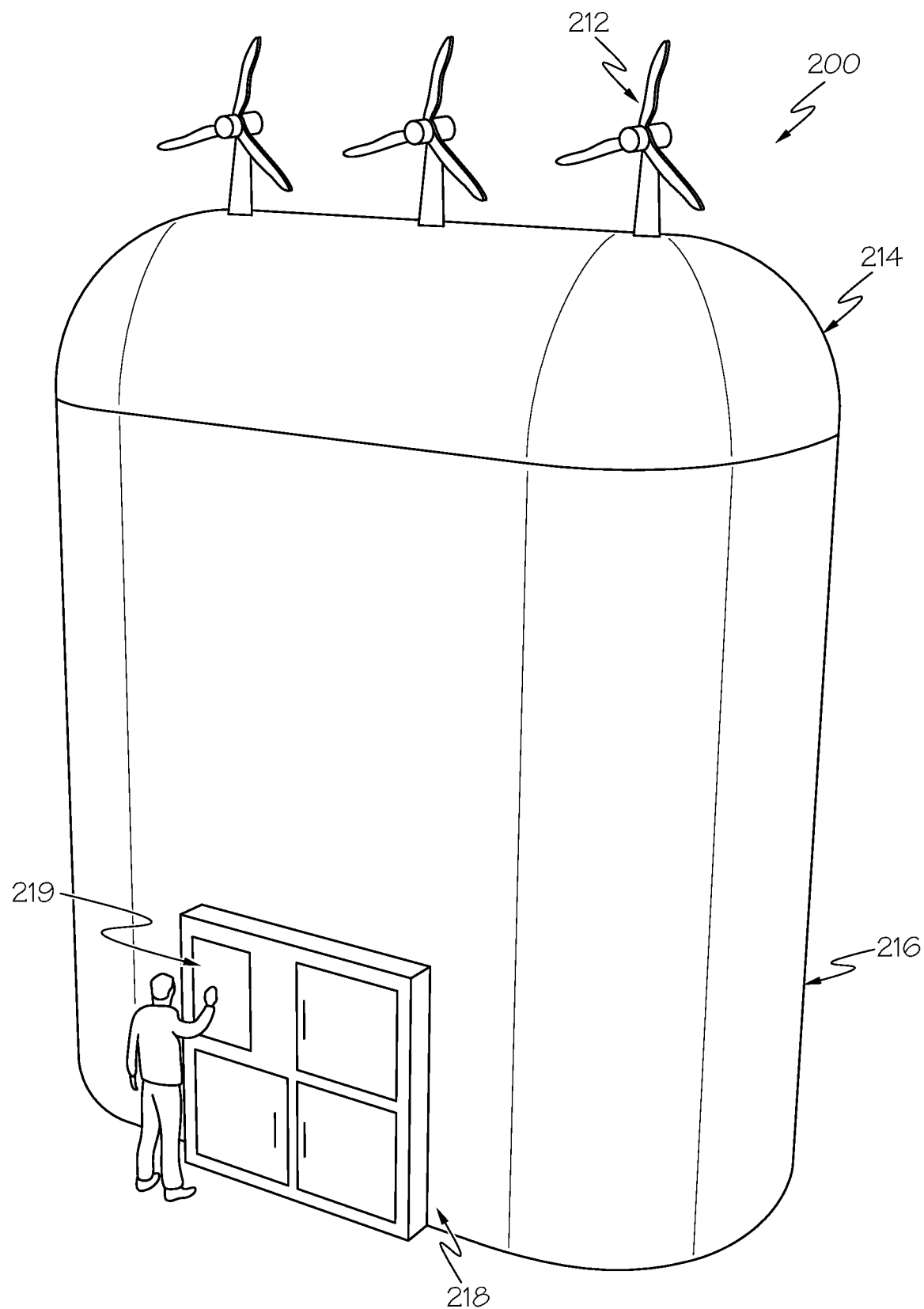
FIG. 2 depicts an external shell enclosing the assembly line grow pod in FIG. 1, according to embodiments described herein.

Referring now to FIG. 2 depicts an external shell 200 of the assembly line grow pod 100 of FIG. 1 according to embodiments described herein. As illustrated, the external shell 200 contains the assembly line grow pod 100 inside, maintains an environment inside, and prevents the external environment from entering. The external shell 200 includes a roof portion 214 and a side wall portion 216. In some embodiments, the roof portion 214 may include photoelectric cells that may generate electric power by receiving sunlight. In some embodiments, the roof portion 214 may include one or more wind turbines 212 that may generate electric power using wind. Coupled to the external shell 200 is a control panel 218 with a user input/output device 219, such as a touch screen, monitor, keyboard, mouse, etc.

The air inside the external shell 200 may be maintained independent of the air outside of the external shell 200. For example, the temperature of the air inside the external shell 200 may be different from the temperature of the air outside the external shell 200. The temperature of the air inside the external shell 200 may be controlled by the HVAC system 310 shown in FIG. 4. The external shell 200 may be made of insulating material that prevents heat from transferring between outside and inside of the external shell 200. Airflow outside the external shell 200 does not affect the airflow inside the external shell 200. For example, the wind speed of the air inside the external shell 200 may be different from the wind speed of the air outside the external shell 200. The air inside the external shell 200 may include nitrogen, oxygen, carbon dioxide, and other gases, the proportions of which are similar to the proportions of the air outside the external shell 200. In some embodiments, the proportions of nitrogen, oxygen, carbon dioxide, and other gases inside the external shell 200 may be different from the proportions of the air outside the external shell 200. The dimensions of the air inside the external shell 200 may be less than, 10,000 cubic feet, for example, about 4,000 cubic feet.

FIG. 3A depicts an industrial cart 104 that may be utilized for the assembly line grow pod 100, according to embodiments described herein. As illustrated, the industrial cart 104 includes a tray section 220 and one or more wheels 222*a*, 222*b*, 222*c*, and 222*d*. The one or more wheels 222*a*, 222*b*, 222*c*, and 222*d* may be configured to rotatably couple with the track 102, as well as receive power, from the track 102. The track 102 may additionally be configured to facilitate communication with the industrial cart 104 through the one or more wheels 222*a*, 222*b*, 222*c*, and 222*d*.

In some embodiments, one or more components may be coupled to the tray section 220. For example, a drive motor 226, a cart computing device 228, and/or a payload 230 may be coupled to the tray section 220 of the industrial cart 104. The tray section 220 may additionally include a payload 230. Depending on the particular embodiment, the payload 230 may be configured as plants (such as in an assembly line grow pod 100); however this is not a requirement, as any payload 230 may be utilized.

The drive motor 226 may be configured as an electric motor and/or any device capable of propelling the industrial cart 104 along the track 102. For example, without limitation, the drive motor 226 may be configured as a stepper motor, an alternating current (AC) or direct current (DC) brushless motor, a DC brushed motor, or the like. In some embodiments, the drive motor 226 may comprise electronic circuitry which may adjust the operation of the drive motor 226 in response to a communication signal (e.g., a command or control signal) transmitted to and received by the drive motor 226. The drive motor 226 may be coupled to the tray section 220 of the industrial cart 104 or directly coupled to the industrial cart 104.

In some embodiments, the cart computing device 228 may control the drive motor 226 in response to a leading sensor 232, a trailing sensor 234, and/or an orthogonal sensor 242 included on the industrial cart 104. Each of the leading sensor 232, the trailing sensor 234, and the orthogonal sensor 242 may comprise an infrared sensor, visual light sensor, an ultrasonic sensor, a pressure sensor, a proximity sensor, a motion sensor, a contact sensor, an image sensor, an inductive sensor (e.g., a magnetometer) or other type of sensor. The industrial cart 104 may include a carbon dioxide sensor 236.

In some embodiments, the leading sensor 232, the trailing sensor 234, the carbon dioxide sensor 236, and/or the orthogonal sensor 242 may be communicatively coupled to the master controller 106 (FIG. 1). In some embodiments, for example, the leading sensor 232, the trailing sensor 234, the carbon dioxide sensor 236, and the orthogonal sensor 242 may generate one or more signals that may be transmitted via the one or more wheels 222a, 222b, 222c, and 222d and the track 102 (FIG. 1). In some embodiments, the track 102 and/or the industrial cart 104 may be communicatively coupled to a network 350 (FIG. 3C). Therefore, the one or more signals may be transmitted to the master controller 106 via the network 350 over network interface hardware 634 (FIG. 9) or the track 102 and in response, the master controller 106 may return a control signal to the drive motor 226 for controlling the operation of one or more drive motors 226 of one or more industrial carts 104 positioned on the track 102. In some embodiments, the master controller 106 may control the operation of the HVAC system 310 to adjust the level of carbon dioxide in the air output from the vent 304 shown in FIG. 3B. For example, the master controller 106 receives the level of carbon dioxide detected by the carbon dioxide sensor 236 and controls the operation of the HVAC system 310 to adjust the level of carbon dioxide in the air from the vent 304.

While FIG. 3A depicts the carbon dioxide sensor 236 positioned generally above the industrial cart 104, as previously stated, the carbon dioxide sensor 236 may be coupled with the industrial cart 104 in any location which allows the carbon dioxide sensor 236 to detect the level of carbon dioxide above and/or below the industrial cart 104. In some embodiments, the carbon dioxide sensor 236 may be positioned on the track 102 or other components of the assembly line grow pod 100.

Figure 9:
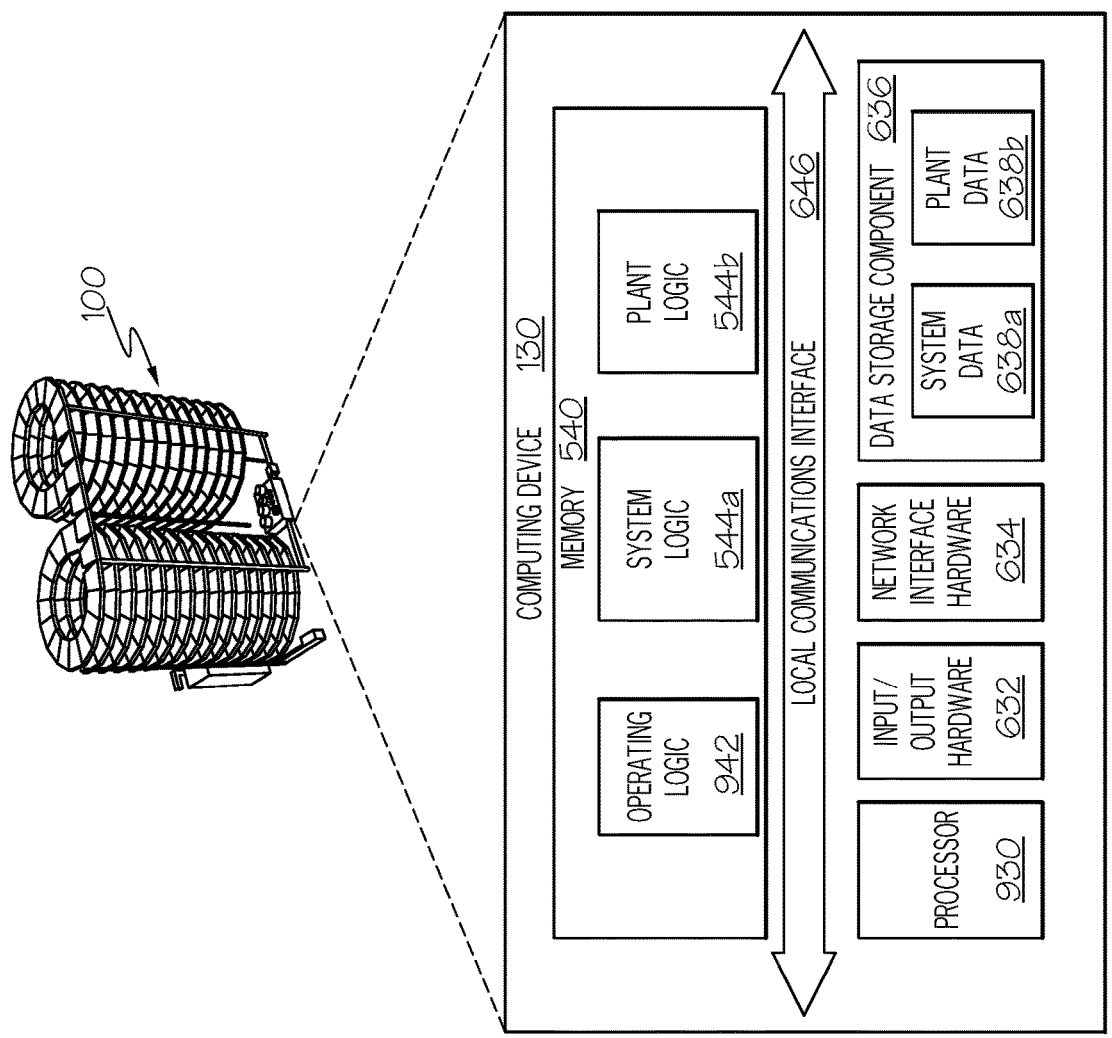
FIG. 9 depicts a computing device for an assembly line grow pod, according to embodiments described herein.

In some embodiments, location markers 224 may be placed along the track 102 or the supporting structures to the track 102 at pre-defined intervals. The orthogonal sensor 242, for example, without limitation, comprises a photo-eye type sensor and may be coupled to the industrial cart 104 such that the photo-eye type sensor may view the location markers 224 positioned along the track 102 below the industrial cart 104. As such, the cart computing device 228 and/or master controller 106 may receive one or more signals generated from the photo-eye in response to detecting a location marker 224 as the industrial cart travels along the track 102. The cart computing device 228 and/or master controller 106, from the one or more signals, may determine the speed of the industrial cart 104. The speed information may be transmitted to the master controller 106 via the network 350 over network interface hardware 634 (FIG. 9).

FIG. 3B depicts a partial view of the assembly line grow pod 100 shown in FIG. 1, according to embodiments described herein. As illustrated, the industrial cart 204b is depicted as being similarly configured as the industrial cart 104 from FIG. 3A. However, in the embodiment of FIG. 3B, the industrial cart 204b is disposed on a track 102. As discussed above, at least a portion of the one or more wheels 222a, 222b, 222c, and 222d (or other portion of the industrial cart 204b) may couple with the track 102 to receive communication signals and/or power.

Also depicted in FIG. 3B are a leading cart 204a and a trailing cart 204c. As the industrial carts 204a, 204b, and 204c are moving along the track 102, the leading sensor 232b and the trailing sensor 234b may detect the trailing cart 204c and the leading cart 204a, respectively, and maintain a predetermined distance from the trailing cart 204c and the leading cart 204a.

As shown in FIG. 1, the airflow line 112 extends a plurality of floors of the assembly line grow pod 100 and, in some embodiments, all floors. The airflow line 112 may include a plurality of vents 304 each of which is configured to output airflow on each story of the assembly line grow pod 100. FIG. 3B depicts a partial view of the airflow line 112 including a vent 304. The vent 304 shown in FIG. 3B is configured to output air as indicated by arrows. The airflow line 112 is connected to the HVAC system 310 which controls the level of carbon dioxide output from the vent 304. The assembly line grow pod 100 and a HVAC system 310 are placed inside the external shell 200 of FIG. 2. The HVAC system 310 operates inside the external shell 200 and may be configured to control temperature, humidity, molecules, flow of the air inside the external shell 200.

The carbon dioxide sensors 236a, 236b, and 236c may detect the level of carbon dioxide on each of the industrial carts 204a, 204b, and 204c, and transmit carbon dioxide level information to the master controller 106. The master controller 106 controls the operation of the HVAC system 310 to control the level of carbon dioxide in the air output from the vent 304 based on the carbon dioxide level information received from the carbon dioxide sensors 236a, 236b, and 236c. In embodiments, the master controller 106 may identify payload 230 on the carts 204a, 204b, and 204c, and control the operation of the HVAC system 310 based on molecular recipes for the identified payload.

Still referring to FIG. 3B, one or more imaging devices 250 may be placed at the bottom of the track 102. The one or more imaging devices 250 may be placed throughout the track 102 including the ascending portion 102a, the descending portion 102b, and the connection portion 102c. The one or more imaging devices 250 may be any device having an array of sensing components (e.g., pixels) capable of detecting radiation in an ultraviolet wavelength band, a visible light wavelength band, or an infrared wavelength band. The one or more imaging devices 250 may have any resolution. The one or more imaging devices 250 are communicatively coupled to the master controller 106. For example, the one or more imaging devices 250 may be hardwired to the master controller 106 and/or may wirelessly communicate with the master controller 106. The one or more imaging devices 250 may capture an image of the payload 230 and transmit the captured image to the master controller 106. The master controller 106 may analyze the captured image to identify the payload 230. The master controller 106 may also identify the size and color of the payload 230 by analyzing the captured image.

Figure 4:
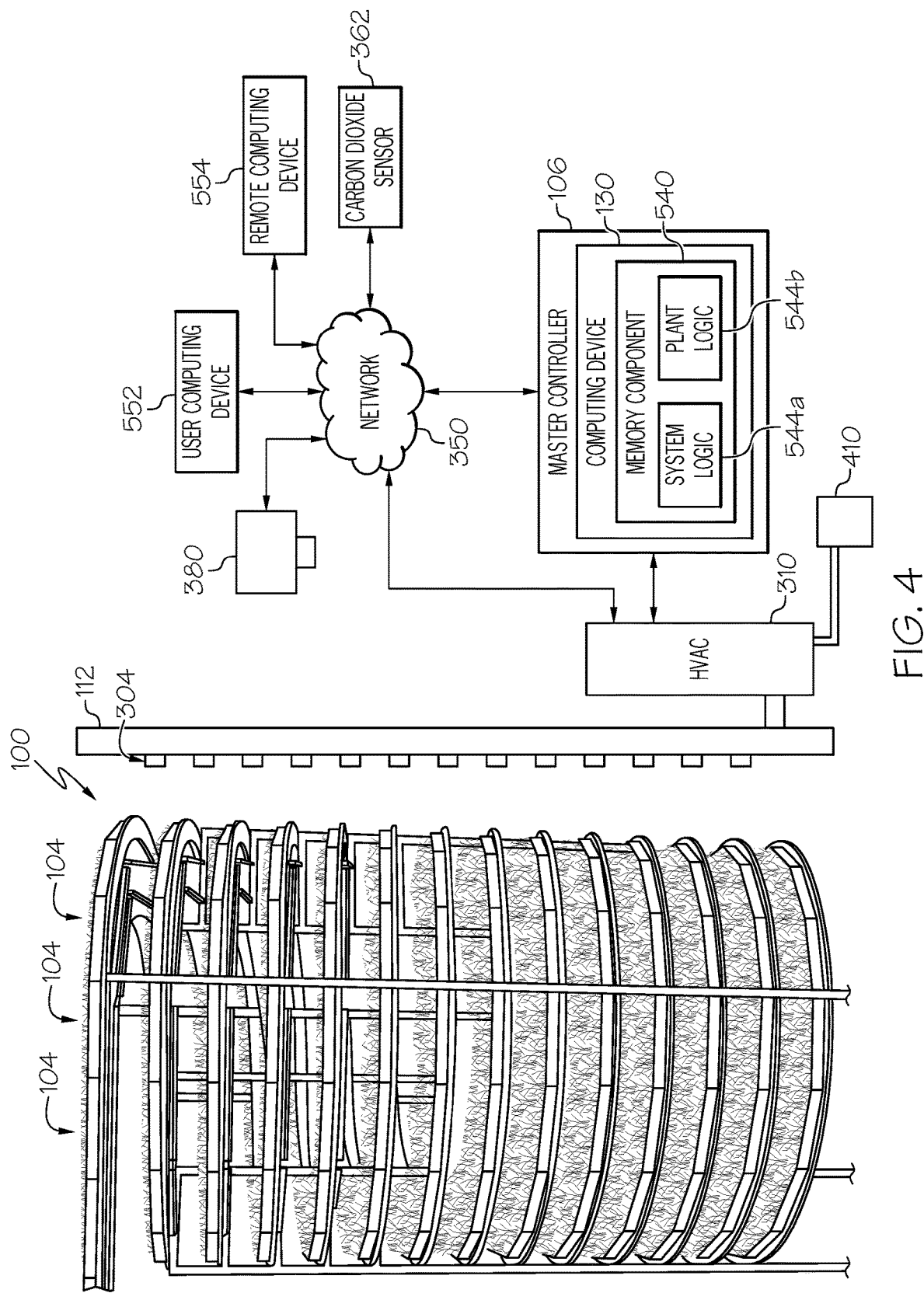
FIG. 4 depicts a plurality of industrial carts in an assembly line configuration, according to embodiments described herein.

FIG. 4 depicts molecular control system, according to one or more embodiments shown and described herein. The assembly line grow pod 100 and a HVAC system 310 are placed inside the external shell 200 of FIG. 2. The HVAC system 310 operates inside the external shell 200 and may be configured to control temperature, humidity, molecules, flow of the air inside the external shell 200. The dimensions of the air inside the external shell 200 may be less than, 10,000 cubic feet, for example, about 4,000 cubic feet. The HVAC system 310 may be optimized for the dimension of the air inside the external shell 200.

As illustrated in FIG. 4, the assembly line grow pod 100 may include the master controller 106, which may include the computing device 130. The computing device 130 may include a memory component 540, which stores systems logic 544a and plant logic 544b. As described in more detail below, the systems logic 544a may monitor and control operations of one or more of the components of the assembly line grow pod 100. For example, the systems logic 544a may monitor and control operations of the HVAC system 310. The plant logic 544b may be configured to determine and/or receive a recipe for plant growth and may facilitate implementation of the recipe via the systems logic 544a. For example, the recipe may include molecular recipes for plants, and the systems logic 544a operates the HVAC system 310 based on the molecular recipes.

The assembly line grow pod 100 monitors the growth of plants carried in the carts 104, and the recipe for plant growth may be updated based on the growth of plants. For example, the molecular recipes for plants may be updated by monitoring the growth of those plants carried in the carts 104.

Additionally, the assembly line grow pod 100 is coupled to a network 350. The network 350 may include the internet or other wide area network, a local network, such as a local area network, a near field network, such as Bluetooth or a near field communication (NFC) network. The network 350 is also coupled to a user computing device 552 and/or a remote computing device 554. The user computing device 552 may include a personal computer, laptop, mobile device, tablet, server, etc. and may be utilized as an interface with a user. As an example, a user may send a recipe to the computing device 130 for implementation by the assembly line grow pod 100. Another example may include the assembly line grow pod 100 sending notifications to a user of the user computing device 552.

Similarly, the remote computing device 554 may include a server, personal computer, tablet, mobile device, etc. and may be utilized for machine to machine communications. As an example, if the assembly line grow pod 100 determines a type of seed being used (and/or other information, such as ambient conditions), the computing device 130 may communicate with the remote computing device 554 to retrieve a previously stored recipe for those conditions. As such, some embodiments may utilize an application program interface (API) to facilitate this or other computer-to-computer communications.

The HVAC system 310 may be connected to a plurality of airflow lines 112. Each of the air flow lines may include a plurality of vents 304. Each of the plurality of vents 304 is configured to output air. In embodiments, the plurality of vents 304 may correspond to the carts 104 on each floor of the assembly line grow pod 100. In some embodiments, the plurality of vents 304 may be placed at different locations. For example, the plurality of vents 304 may be placed at the top of the assembly line grow pod 100. As another example, the plurality of vents 304 may be placed at the bottom of the assembly line grow pod 100, and output air through a central axis of the ascending portion 102a or the descending portion 102b.

The HVAC system 310 may output air through the plurality of vents 304 according to a molecular recipe for plants. An air tank 410 may be connected to the HVAC system 310. The air tank 410 may provide air containing carbon dioxide, oxygen, nitrogen, argon, hydrogen, and any other molecular gas to the HVAC system 310. The HVAC system 310 transfers the air to the plurality of vents 304.

The level of carbon dioxide inside the external shell 200 may be detected by one or more carbon dioxide sensors 362. The one or more carbon dioxide sensors 362 may be positioned proximate to the track 102, carts 104, or at any other locations within the external shell 200. The one or more carbon dioxide sensors 362 may be wired to or wirelessly coupled to the master controller 106. For example, the one or more carbon dioxide sensors 362 may wirelessly transmit the detected carbon dioxide level to the master controller 106 via the network 350. The master controller 106 compares the current level of carbon dioxide of the air inside the external shell 200 with the molecular recipe. For example, if the level of carbon dioxide of air inside the external shell 200 is 150 ppm, and the molecular recipe for the plant cultivated in the assembly line grow pod 100 is 500 ppm, the master controller 106 instructs the HVAC system 310 to output air having increased carbon dioxide concentration until the level of carbon dioxide inside the external shell 200 becomes 500 ppm.

The molecular recipes for plants may be stored in the plant logic 544b of the memory component 540 (and/or in the plant data 638b from FIG. 7) and the master controller 106 may retrieve the molecular recipes from the plant logic 544b. For example, the plant logic 544b may include molecular recipes for plants as shown in Table 1 below.

TABLE 1

|  | Carbon Dioxide Concentration |
|---|---|
| Plant A | 500 ppm |
| Plant B | 300 ppm |
| Plant C | 250 ppm |
| Plant D | 200 ppm |
| Plant E | 800 ppm |

The master controller 106 may identify plants in the carts 104. For example, the master controller 106 may communicate with the carts 104 and receive information about the plants in the carts 104. As another example, the information about the plants in the carts 104 may be pre-stored in the master controller 106 when the seeder component 108 seeds plant A in the carts 104. As another example, the master controller 106 may receive images of the plants in the carts 104 captured by the one or more imaging devices 250 and identify the plants in the carts based on the captured images.

The master controller 106 may control the HVAC system 310 based on the identified plants. In one example, if the current plant in the assembly line grow pod 100 is identified as plant B, and the current carbon dioxide concentration of the air inside the external shell 200 is 200 ppm, then, the master controller 106 controls the HVAC system 310 to output air having high concentration of carbon dioxide until the carbon dioxide concentration of the air inside the external shell 200 reaches 300 ppm. As another example, if the current plant in the assembly line grow pod 100 is identified as plan D, and the current carbon dioxide level of the air inside the external shell 200 is 500 ppm, then, the master controller 106 controls the HVAC system 310 to output air having low concentration of carbon dioxide until the carbon dioxide concentration of the air inside the external shell 200 goes down to 200 ppm. In embodiments, the molecular recipes for plants may be updated based on information on harvested plants, for example, size and color of the harvested plants.

In some embodiments, the master controller 106 may receive a preferred carbon dioxide level from the user computing device 552. For example, an operator inputs a carbon dioxide level for plants currently growing in the assembly line grow pod 100. The master controller 106 receives the carbon dioxide level and operates the HVAC system 310 based on the received carbon dioxide level.

In embodiments, the master controller 106 may receive image of plants carried in the carts 104 from one or more imaging devices 380. One or more imaging devices 380 may be placed at the bottom of the track 102, e.g., the imaging devices 250 shown in FIG. 3B. The one or more imaging device 380 may be placed throughout the track 102 including the ascending portion 102a, the descending portion 102b, and the connection portion 102c. The one or more imaging devices 380 may be any device having an array of sensing components (e.g., pixels) capable of detecting radiation in an ultraviolet wavelength band, a visible light wavelength band, or an infrared wavelength band. The one or more imaging devices 380 are communicatively coupled to the master controller 106. For example, the one or more imaging devices 380 may be hardwired to the master controller 106 and/or may wirelessly communicate with the master controller 106. The one or more imaging devices 380 may capture an image of the plants carried in the carts 104 and transmit the captured image to the master controller 106.

In some embodiments, the assembly line grow pod 100 may include sensors for detecting concentrations of other gases, for example, $O_2$, $N_2$, etc. The master controller 106 receives concentration of $O_2$, $N_2$, and $CO_2$, and controls the HVAC system 310 to adjust the carbon dioxide concentration based on the relative concentration of $O_2$, $N_2$, and $CO_2$.

Figure 5A:
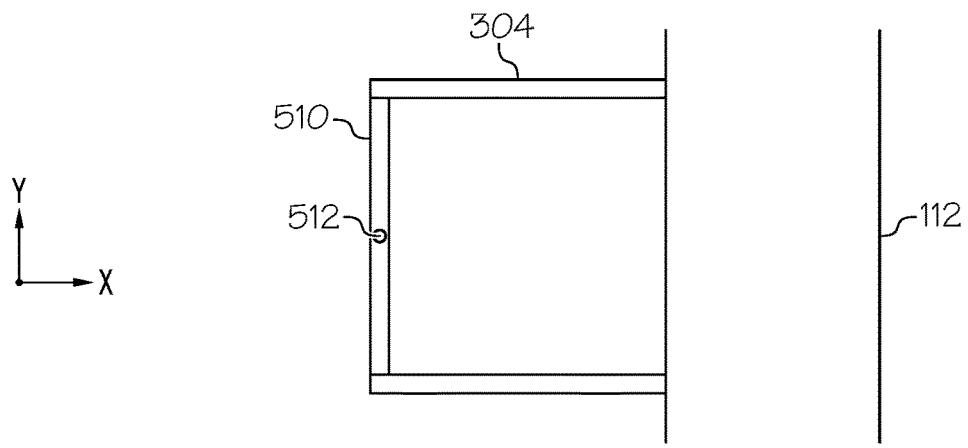
FIG. 5A depicts an operation of a valve attached to a vent, according to embodiments described herein.
Figure 5B:
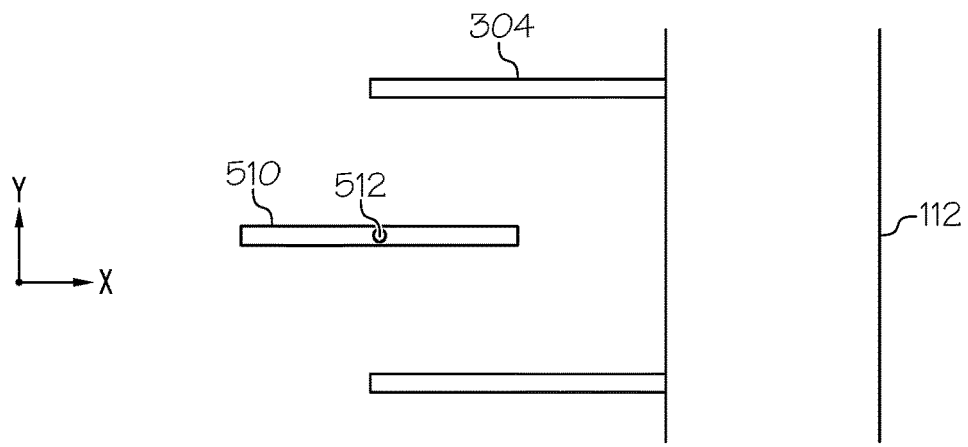
FIG. 5B depicts an operation of a valve attached to a vent, according to embodiments described herein.
Figure 5C:
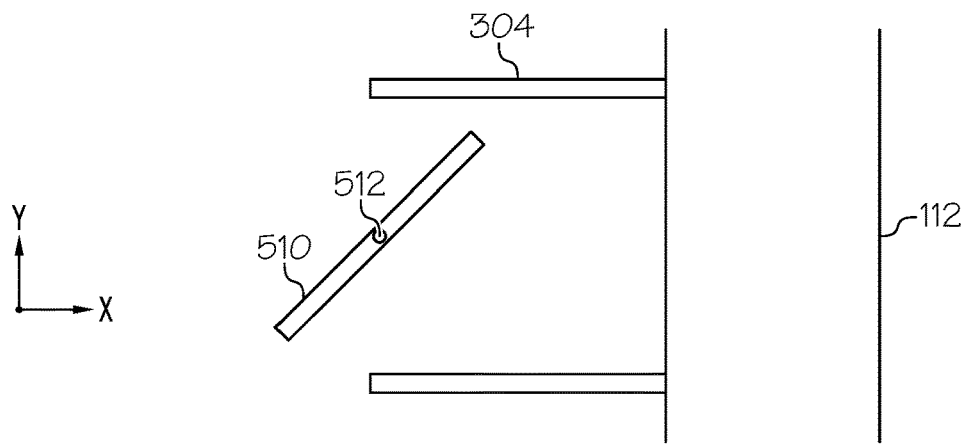
FIG. 5C depicts an operation of a valve attached to a vent, according to embodiments described herein.

FIGS. 5A through 5C depict operations of a valve connected to the vent 304, according to embodiments described herein. The valve 510 may be a round plate that fits into a hole of the vent 304. The valve 510 is configured to rotate about an axis 512. The operation of the valve 510 may be controlled by the master controller 106. For example, the valve 510 receives an instruction from the master controller 106 through a wire connected between the valve 510 and the master controller 106. As another example, the valve 510 may have wireless communication function, and receive instructions from the master controller 106 through a wireless communication.

The valve 510 controls the amount of air output from the vent 304 by rotating about the axis 512. For example, in FIG. 5A, the valve 510 is fully closed. The valve 510 is aligned with the y axis such that the valve 510 blocks the hole of the vent 304. The valve 510 prevents air including carbon dioxide, oxygen, or other gas in vent 304 from flowing into the inside of the external shell 200 of the assembly line grow pod 100. In FIG. 5B, the valve 510 is rotated about 90 degrees from its position in FIG. 5B, and is aligned with the x axis such that the valve 510 opens the hole of the vent 304. The valve 510 allows air including carbon dioxide, oxygen, and/or other gas in the vent 304 to flow into air inside of the external shell 200 of the assembly line grow pod 100. In FIG. 5C, the valve 510 is rotated about 45 degrees from its position in FIG. 5A.

The master controller 106 may control the amount of air including carbon dioxide, oxygen, or other gas provided to inside of the external shell 200 of the assembly line grow pod 100 by controlling the valves 510 of the vents 304, respectively. The master controller 106 may control the valves 510 based on various factors. In some embodiments, the master controller 106 may control one or more of the valves 510 based on recipes for plants in the carts 104. For example, the master controller 106 identifies plants in the cart 104 moving along the track 102, and retrieves the carbon dioxide concentration level required by the recipe for the plants in the cart 104. Then, the master controller 106 compares the carbon dioxide concentration level required by the recipe with a carbon dioxide concentration level measured by the carbon dioxide sensor 362. If the carbon dioxide concentration level required by the recipe is greater than the carbon dioxide concentration level measured by the carbon dioxide sensor 365, the master controller 106 may transmit an instruction to the valve 510 to rotate such that air containing high concentration of carbon dioxide can pass through the valve 510 and flow into the air inside the external shell 200. If the carbon dioxide concentration level required by the recipe is less than the carbon dioxide concentration level measured by the carbon dioxide sensor 362, the master controller 106 may transmit an instruction to the valve 510 to rotate such that no carbon dioxide can pass through the valve 510 and flow into the air inside the external shell 200. In another embodiment, the master controller 106 may control the level of oxygen concentration in a similar way as controlling the level of carbon dioxide as discussed above.

In some embodiments, the master controller 106 may control the air tank 410 based on a day or night cycle for one or more of the cart 104. The master controller 106 may determine that the plants in the carts 104 are in a day cycle if a lighting device above the corresponding cart is on. Conversely, the master controller 106 may determine that the plants in the carts 104 are in a night cycle if a lighting device above the corresponding cart is off. Generally, plants in a day cycle require more carbon dioxide than the plants in a night cycle because the plants photosynthesize during day. Thus, the master controller 106 may control the air tank 410 to provide air containing high concentration of carbon dioxide when the plants in the carts switch from the night cycle to the day cycle. Conversely, the master controller 106 controls the air tank 410 to provide air containing low concentration of carbon dioxide when the plants in the carts switch from the day cycle to the night cycle.

In some embodiments, the master controller 106 may control the air tank 410 based on the chlorophyll level of plants in the carts. The imaging device 380 may capture the image of the plants and process the image to determine the chlorophyll level of plants. As the amount of the photosynthesis by the plants increases, the plants require more carbon dioxide. Thus, the master controller 106 may control the air tank 410 to provide more carbon dioxide as the chlorophyll level of plants increases, and provide less carbon dioxide as the chlorophyll level of plants decreases.

The assembly line grow pod 100 provides carbon dioxide to the plants in the carts through the airflow line 112 as well as one or more water lines 110 in FIG. 1. As discussed above with reference to FIG. 1, a watering component is coupled to one or more water lines 110 and distributes water and/or nutrients to one or more trays at predetermined areas of the assembly line grow pod 100. In some embodiments, the watering component may be connected with a carbon dioxide pump which may inject carbon dioxide into the watering component. The master controller 106 may instruct the carbon dioxide pump to inject carbon dioxide in the watering component. The amount of the carbon dioxide to be injected may be determined based on various factors including a recipe for plants, day/night cycle, plant growth, etc.

Figure 6:
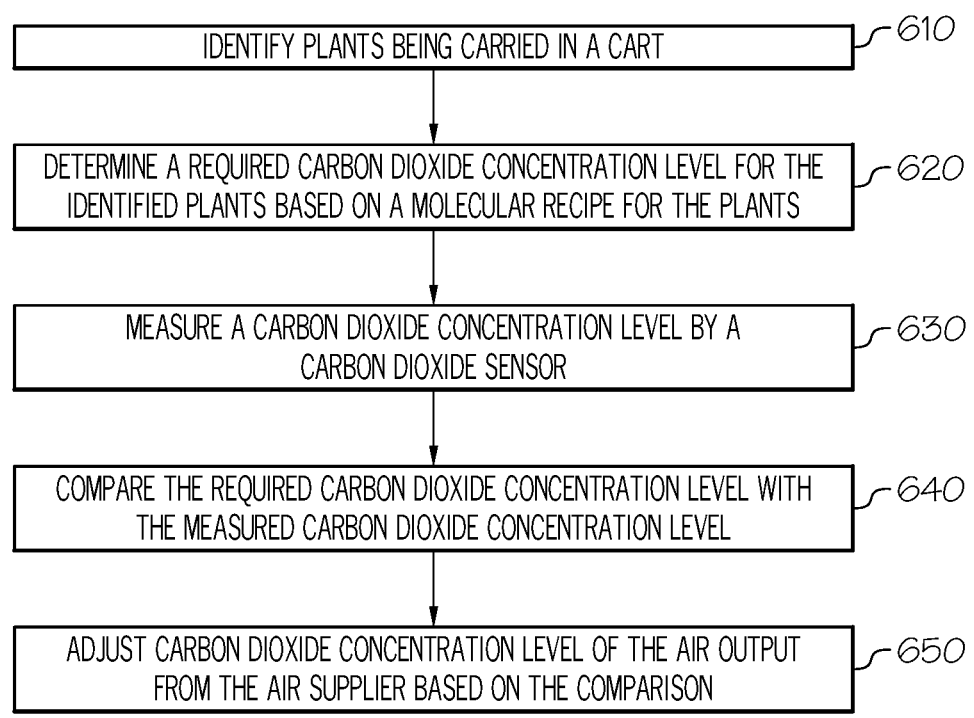
FIG. 6 depicts a flowchart for controlling molecular air for the assembly line grow pod, according to embodiments described herein.

FIG. 6 depicts a flowchart for controlling molecular air in the assembly line grow pod 100, according to one or more embodiments described herein. As illustrated in block 610, the master controller 106 identifies the plant being carried in the cart 104. For example, an operator inputs the type of seeds for plants that need to be grown in the cart through the user computing device 552, and the master controller 106 receives the type of seeds for plant from the user computing device 552. As another example, the master controller 106 may obtain identification of the plant from the seeder component 108 that seeds the plant in the cart. As another example, the master controller 106 may communicate with the cart 104 and receive information about the plant in the cart 104. As another example, the master controller 106 may receive images of the plant in the cart 104 captured by the one or more imaging devices 250 and identify the plant in the cart 104 based on the captured images.

In block 620, the master controller 106 determines a target carbon dioxide concentration level for the identified plant based on a molecular recipe for the identified plant. Molecular recipes include a plurality of plants and preferred carbon dioxide concentration levels for the plurality of plants, for example, as shown in Table 1 above. For example, if the identified plant is plant C, the target carbon dioxide concentration level is determined as 250 ppm based on the molecular recipe of Table 1. In embodiments, the molecular recipe may be pre-stored in the plant logic 544b of the master controller 106. In some embodiments, the molecular recipe may be entered by an operator through the user computing device 552, and the master controller 106 receives the molecular recipe from the user computing device 552. In some embodiments, the molecular recipe may be stored in the remote computing device 554, and the master controller 106 retrieves the molecular recipe from the remote computing device 554.

In some embodiments, the master controller 106 may calculate absorption of carbon dioxide by the plant in the assembly line grow pod 100 to calculate the target carbon dioxide concentration level. The master controller 106 may measure the change of carbon dioxide concentration level over time, and utilize the change to calculate the absorption of carbon dioxide by the plant.

In block 630, a carbon dioxide sensor 362 may measure a carbon dioxide concentration level within the external shell 200. In embodiments, the carbon dioxide sensor 362 may be carried in the industrial cart 104 such that the carbon dioxide concentration level at each of the industrial carts 104 may be precisely measured. In some embodiments, one or more carbon dioxide sensors 362 may be positioned along the track 102. The carbon dioxide sensor 362 transmits the measured carbon dioxide concentration level to the master controller 106.

In block 640, the master controller 106 compares the target carbon dioxide concentration level with the measured carbon dioxide concentration level. In block 650, the master controller 106 adjusts carbon dioxide concentration level of the air output from the air supplier based on the comparison made in block 640. For example, if the measured carbon dioxide concentration level is less than the target carbon dioxide concentration level, the master controller 106 increase the carbon dioxide concentration level of the air output from the HVAC system 310 by instructing the air tank 410 to provide increased level of carbon dioxide to the HVAC system 310. If the measured carbon dioxide concentration level is greater than the target carbon dioxide concentration level, the master controller 106 decreases the carbon dioxide concentration level of the air output from the HVAC system 310 by instructing the air tank 410 to provide less or no carbon dioxide to the HVAC system 310. In some embodiments, if the measured carbon dioxide concentration level is greater than the target carbon dioxide concentration level, the master controller 106 may instruct the HVAC system 310 to recapture $CO_2$.

Figure 7:
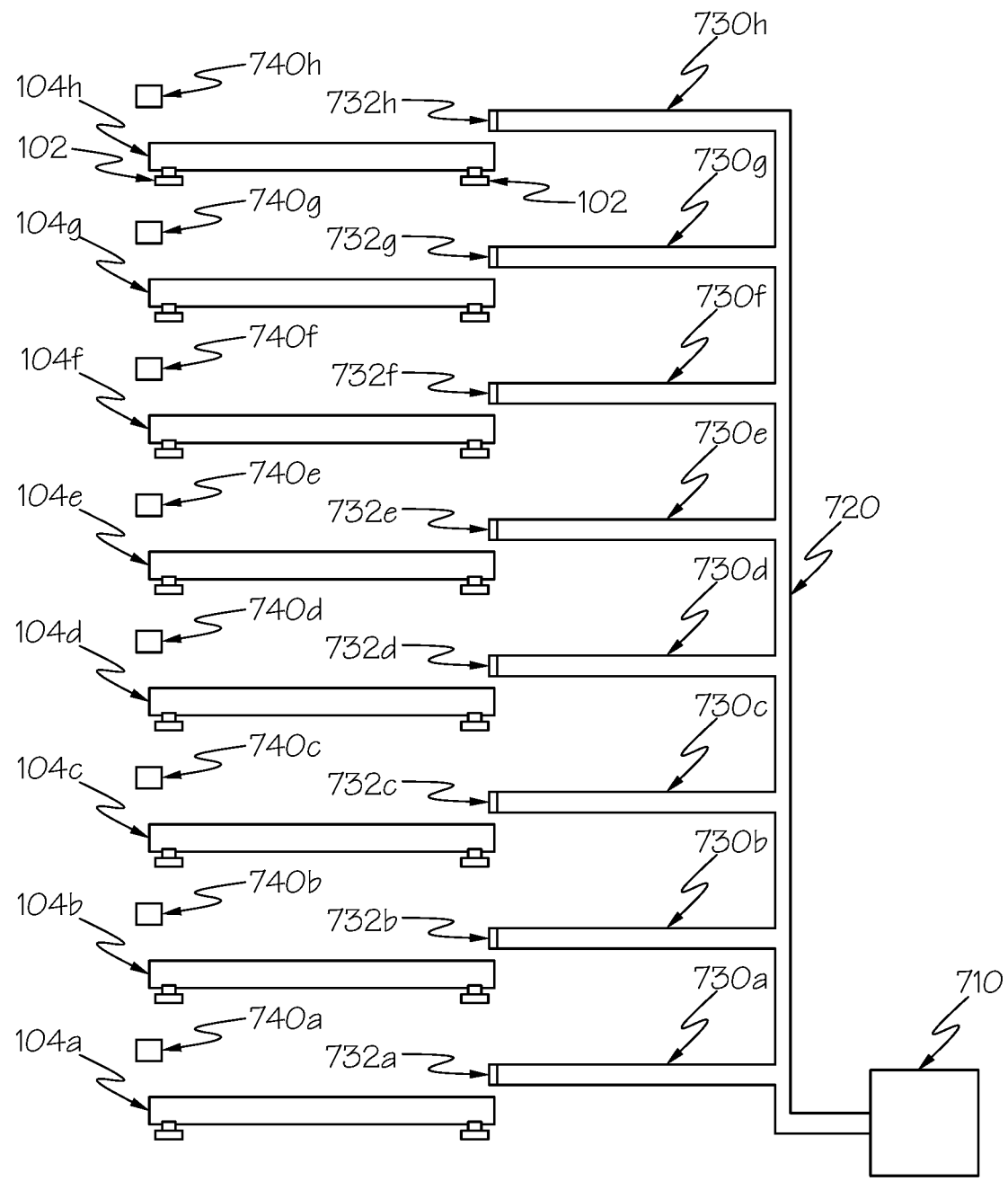
FIG. 7 depicts collecting oxygen produced by plants in carts in accordance with one or more embodiments shown and described herein.

FIG. 7 depicts collecting oxygen produced by plants in carts in accordance with one or more embodiments shown and described herein. An airflow channel 720 is connected with an air storage 710. A plurality of airflow arms 730a through 730h are connected to the airflow channel 720. One end of the each of the airflow arms 730a through 730h is placed proximate to plants in the carts 104a through 104h in order to collect oxygen produced by the plants. The air storage intakes oxygen produced by the plants through the airflow arms 730a through 730h.

Each of the airflow arms 730a through 730h may include a valve similar to the valve 510 in FIGS. 5A through 5C. The master controller 106 may control the valves 732a through 732h based on various factors. In some embodiments, the master controller 106 controls the valves 732a through 732h based on the carbon dioxide concentration level measured by the carbon dioxide sensors 740a through 740h. If the carbon dioxide concentration level measured by the carbon dioxide sensor 740a is greater than a threshold level, then the master controller 106 may instruct the valve 732a to be closed such that no air flows into the airflow arm 730a. If the carbon dioxide concentration level measured by the carbon dioxide sensor 740a is less than the threshold level, the master controller 106 instructs the valve 732a to be opened such that air flows into the airflow arm 730a.

In some embodiments, the master controller 106 controls the valves 732a through 732h based on a day or night cycle for one or more of the carts 104a through 104h. The master controller 106 may determine that the plants in one of the carts 104a through 104h are in a day cycle if a lighting device above the corresponding cart is on. Conversely, the master controller 106 may determine that the plants in one of the carts 104a through 104h are in a night cycle if a lighting device above the corresponding cart is off. Generally, plants in a day cycle produce more oxygen than the plants in a night cycle because the plants photosynthesize during daytime. Thus, for example, the master controller 106 instructs the valve 732a to be closed such that no air flows into the airflow arm 730a if the lighting device above the corresponding cart is off. The master controller 106 instructs the valve 732a to be opened such that air flows into the airflow arm 730a if the lighting device above the corresponding cart is on.

Figure 8:
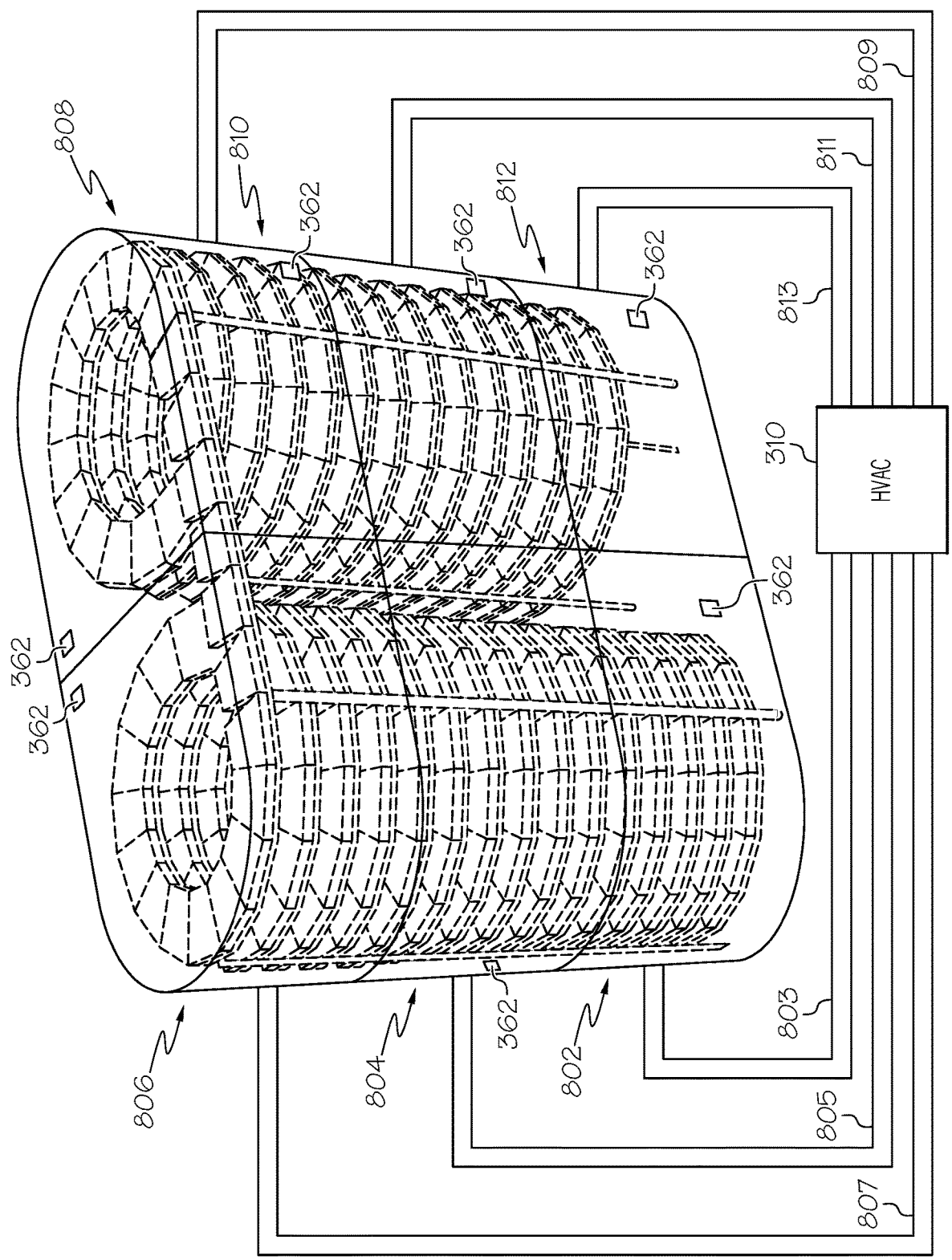
FIG. 8 depicts an assembly line grow pod having a plurality of enclosed areas, according to one or more embodiments described herein.

FIG. 8 depicts an assembly line grow pod 100 having a plurality of enclosed areas, according to one or more embodiments described herein. For example, the space inside the external shell 200 may be divided into six enclosed areas 802, 804, 806, 808, 810, and 812. Each of the six enclosed areas 802, 804, 806, 808, 810, and 812 is enclosed by material that prevents airflow between the areas. For example, each of the six enclosed areas 802, 804, 806, 808, 810, and 812 may be enclosed by separation walls made of insulating material. Thus, the carbon dioxide concentration levels in the six enclosed areas 802, 804, 806, 808, 810, and 812, may be different from each other. A carbon dioxide sensor 362 may be located in each of the enclosed areas. The carts 104 may move along the track 102 in each of the enclosed areas 802, 804, 806, 808, 810, and 812. While FIG. 8 depicts six enclosed areas, the space inside the external shell 200 may be divided into less than or more than six areas. Openings or doors may be present between adjacent enclosed areas such that the carts 104 can move from one enclosed area to other enclosed area.

In embodiments, each of the enclosed areas represents different days of simulated growth for plants. For example, the plants in the enclosed area 802 are in day 1 of simulated growth, the plants in the enclosed area 804 are in day 2 of simulated growth, the plants in the enclosed area 806 are in day 3 of simulated growth, the plants in the enclosed area 808 are in day 4 of simulated growth, the plants in the enclosed area 810 are in day 5 of simulated growth, and the plants in the enclosed area 812 are in day 6 of simulated growth.

The HVAC system 310 may provide air with a certain level of carbon dioxide concentration to each of the enclosed areas 802, 804, 806, 808, 810, and 812 through, for example, air flow lines 803, 805, 807, 809, 811, and 813 connected to the enclosed areas 802, 804, 806, 808, 810, and 812, respectively. The HVAC system 310 may control the temperature and/or humidity of the enclosed areas 802, 804, 806, 808, 810, and 812, independently. In embodiments, the master controller 106 may identify plants in the enclosed areas 802, 804, 806, 808, 810, and 812 and instruct the HVAC system 310 to control the carbon dioxide concentration level in the enclosed areas 802, 804, 806, 808, 810, and 812 based on the molecular recipe for the identified plants. For example, the master controller 106 may identify that plant A is being carried in the enclosed areas 808, 810, and 812, and plant B is being carried in the enclosed areas 802, 804, and 806. Exemplary molecular recipes for plant A and plant B according to simulated days of growth are shown in Tables 2 and 3 below.

TABLE 2

| Molecular Recipe for Plant A | |
|---|---|
| Simulated days of growth | Carbon dioxide concentration |
| Day 1 | 200 ppm |
| Day 2 | 300 ppm |
| Day 3 | 400 ppm |
| Day 4 | 400 ppm |
| Day 5 | 500 ppm |
| Day 6 | 450 ppm |

TABLE 3

| Molecular Recipe for Plant B | |
|---|---|
| Simulated days of growth | Carbon dioxide concentration |
| Day 1 | 150 ppm |
| Day 2 | 200 ppm |
| Day 3 | 250 ppm |
| Day 4 | 250 ppm |
| Day 5 | 300 ppm |
| Day 6 | 250 ppm |

The master controller 106 instructs the HVAC system 310 to control the carbon dioxide concentration level in the enclosed areas 802, 804, and 806 according to the molecular recipe for Plant B. Specifically, the HVAC system 310 maintains the carbon dioxide concentration level in the enclosed area 802 at or above 150 ppm given that the enclosed area 802 corresponds to an environment for Day 1 simulated of growth. The HVAC system 310 maintains the carbon dioxide concentration level in the enclosed area 804 at or above 200 ppm given that the enclosed area 804 corresponds to an environment for Day 2 simulated of growth.

Similarly, the master controller 106 instructs the HVAC system 310 to control the carbon dioxide concentration level in the enclosed areas 808, 810, and 812 according to the molecular recipe for Plant A. Specifically, the HVAC system 310 maintains the carbon dioxide concentration level in the enclosed area 808 at or above 400 ppm given that the enclosed area 508 corresponds to an environment for Day 4 simulated of growth. The HVAC system 310 maintains the carbon dioxide concentration level in the enclosed area 810 at or above 500 ppm given that the enclosed area 810 corresponds to an environment for Day 5 simulated of growth.

FIG. 9 depicts a computing device 130 for an assembly line grow pod 100, according to embodiments described herein. As illustrated, the computing device 130 includes a processor 930, input/output hardware 632, the network interface hardware 634, a data storage component 636 (which stores systems data 638a, plant data 638b, and/or other data), and the memory component 540. The memory component 540 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 130 and/or external to the computing device 130.

The memory component 540 may store operating logic 942, the systems logic 544a, and the plant logic 544b. The systems logic 544a and the plant logic 544b may each include a plurality of different pieces of logic, each of which may be embodied as a computer program, firmware, and/or hardware, as an example. A local interface 646 is also included in FIG. 9 and may be implemented as a bus or other communication interface to facilitate communication among the components of the computing device 130.

The processor 930 may include any processing component operable to receive and execute instructions (such as from a data storage component 636 and/or the memory component 540). The input/output hardware 632 may include and/or be configured to interface with microphones, speakers, a display, and/or other hardware.

The network interface hardware 634 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 130 and other computing devices, such as the user computing device 552 and/or remote computing device 554.

The operating logic 942 may include an operating system and/or other software for managing components of the computing device 130. As also discussed above, systems logic 544a and the plant logic 544b may reside in the memory component 540 and may be configured to performer the functionality, as described herein.

It should be understood that while the components in FIG. 9 are illustrated as residing within the computing device 130, this is merely an example. In some embodiments, one or more of the components may reside external to the computing device 130. It should also be understood that, while the computing device 130 is illustrated as a single device, this is also merely an example. In some embodiments, the systems logic 544a and the plant logic 544b may reside on different computing devices. As an example, one or more of the functionalities and/or components described herein may be provided by the user computing device 552 and/or remote computing device 554.

Additionally, while the computing device 130 is illustrated with the systems logic 544a and the plant logic 544b as separate logical components, this is also an example. In some embodiments, a single piece of logic (and/or or several linked modules) may cause the computing device 130 to provide the described functionality.

As illustrated above, various embodiments for providing molecular air control in a grow pod are provided. These embodiments create a quick growing, small footprint, chemical free, low labor solution to growing microgreens and other plants for harvesting. These embodiments may create recipes and/or receive recipes that dictate temperature and humidity which optimize plant growth and output. The recipe may be implemented strictly and/or modified based on results of a particular plant, tray, or crop.

Accordingly, some embodiments may include a molecular air control system. The system includes a shell including an enclosed area, a cart moving on a track within the enclosed area, an air supplier configured to output air into the enclosed area, and a controller. The controller includes one or more processors, one or more memory modules, and machine readable instructions stored in the one or more memory modules that, when executed by the one or more processors, cause the controller to: identify a plant on the cart; determine a target carbon dioxide concentration level for the identified plant based on a molecular recipe for the identified plant; receive a current carbon dioxide concentration level from a carbon dioxide sensor; compare the target carbon dioxide concentration level with the current carbon dioxide concentration level; and adjust carbon dioxide concentration level of the air output from the air supplier based on the comparison.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A molecular air control system comprising:
   a shell including an enclosed area;
   a plurality of carts moving on a track within the enclosed area;
   an air supplier configured to output air into the enclosed area; and
   a controller comprising:
      one or more processors;
      one or more memory modules; and
      machine readable instructions stored in the one or more memory modules that, when executed by the one or more processors, cause the controller to:
         identify a plant on a selected one of the carts;
         determine a target carbon dioxide concentration level for the identified plant based on a molecular recipe for the identified plant;
         receive a current carbon dioxide concentration level from a carbon dioxide sensor located on the selected cart;
         compare the target carbon dioxide concentration level with the current carbon dioxide concentration level; and
         adjust carbon dioxide concentration level of the air being output from the air supplier based on the comparison.

2. The molecular air control system of claim 1, wherein the machine readable instructions stored in the one or more memory modules, when executed by the one or more processors, cause the controller to:
   determine whether the plant on the selected cart is in a day cycle or a night cycle; and
   adjust the carbon dioxide concentration level of the air being output from the air supplier based on the determination on whether the plant on the selected cart is in a day cycle or a night cycle.

3. The molecular air control system of claim 2, wherein the machine readable instructions stored in the one or more memory modules, when executed by the one or more processors, cause the controller to:
   determine whether a lighting device above the selected cart is off; and
   determine that the plant on the selected cart is in a night cycle in response to determination that the lighting device above the selected cart is off.

4. The molecular air control system of claim 1, further comprising a camera configured to capture an image of the plant in one or more of the carts and transmit the captured image to the controller.

5. The molecular air control system of claim 4, wherein the machine readable instructions stored in the one or more memory modules, when executed by the one or more processors, cause the controller to update the molecular recipe based on the captured image of the plant.

6. The molecular air control system of claim 1, further comprising:
   an airflow lines connected to the air supplier; and
   a plurality of vents connected to the airflow lines.

7. The molecular air control system of claim 6, wherein:
   each of the plurality of vents includes a valve configured to rotate, and the machine readable instructions stored in the one or more memory modules, when executed by the one or more processors, cause the controller to rotate the valve based on the comparison.

8. The molecular air control system of claim 1, wherein the machine readable instructions stored in the one or more memory modules, when executed by the one or more processors, cause the controller to:
receive an image of the plant;
process the image to determine a level of chlorophyll of the plant; and
adjust the carbon dioxide concentration level of the air being output from the air supplier based on the level of chlorophyll.

9. The molecular air control system of claim 1, wherein the enclosed area includes a plurality of sub-enclosed areas, and
the machine readable instructions stored in the one or more memory modules, when executed by the one or more processors, cause the controller to control the carbon dioxide concentration level in the plurality of sub-enclosed areas independently.

10. A controller for controlling molecular air in an assembly line grow pod, the controller comprising:
one or more processors;
one or more memory modules; and
machine readable instructions stored in the one or more memory modules that, when executed by the one or more processors, cause the controller to:
identify a plant in a selected cart of a plurality of carts moving on a track in the assembly line grow pod;
determine a target carbon dioxide concentration level for the identified plant based on a molecular recipe for the identified plant;
receive a current carbon dioxide concentration level from a carbon dioxide sensor located on the selected cart;
compare the target carbon dioxide concentration level with the current carbon dioxide concentration level; and
adjust carbon dioxide concentration level of air output from an air supplier of the assembly line grow pod based on the comparison.

11. The controller of claim 10, wherein the machine readable instructions stored in the one or more memory modules, when executed by the one or more processors, cause the controller to:
determine whether the plant on the selected cart is in a day cycle or a night cycle; and
adjust the carbon dioxide concentration level of air output from the air supplier based on the determination.

12. The controller of claim 10, wherein the machine readable instructions stored in the one or more memory modules, when executed by the one or more processors, cause the controller to:
determine whether a lighting device above the selected cart is off; and
determine that the plant on the selected cart is in a night cycle in response to determination that the lighting device above the selected cart is off.

13. The controller of claim 10, wherein the machine readable instructions stored in the one or more memory modules, when executed by the one or more processors, cause the controller to:
receive an image of the plant in one or more of the carts; and
update the molecular recipe based on the image of the plant.

14. The controller of claim 10, wherein the machine readable instructions stored in the one or more memory modules, when executed by the one or more processors, cause the controller to transmit an instruction for rotating a valve based on the comparison, and
the valve is rotatably coupled to a vent connected to the air supplier.

15. The controller of claim 10, wherein the machine readable instructions stored in the one or more memory modules, when executed by the one or more processors, cause the controller to:
receive an image of the plant;
process the image to determine a level of chlorophyll of the plant; and
adjust the carbon dioxide concentration level of the air being output from the air supplier based on the level of chlorophyll.

16. A method for controlling molecular air for a plant in an assembly line grow pod, the method comprising:
identifying, by a controller of the assembly line grow pod, a plant in a selected cart of a plurality of carts moving on a track in the assembly line grow pod;
determining, by the controller of the assembly line grow pod, a target carbon dioxide concentration level for the identified plant based on a molecular recipe for the identified plant;
receiving, by the controller of the assembly line grow pod, a current carbon dioxide concentration level from a carbon dioxide sensor located on the selected cart;
comparing, by the controller of the assembly line grow pod, the target carbon dioxide concentration level with the current carbon dioxide concentration level; and
adjusting, by the controller of the assembly line grow pod, carbon dioxide concentration level of air being output from an air supplier of the assembly line grow pod based on the comparison.

17. The method of claim 16, further comprising:
determining whether the plant on the selected cart is in a day cycle or a night cycle; and
adjusting the carbon dioxide concentration level of air output from the air supplier based on determining whether the plant on the selected cart is in a day cycle or a night cycle.

18. The method of claim 17, further comprising:
determining whether a lighting device above the selected cart is off; and
determining that the plant on the selected cart is in a night cycle in response to determination that the lighting device above the selected cart is off.

19. The method of claim 16, further comprising:
receiving an image of the plant in one or more carts; and
updating the molecular recipe based on the image of the plant.

* * * * *